US006650069B2

United States Patent
Kito

(10) Patent No.: US 6,650,069 B2
(45) Date of Patent: Nov. 18, 2003

(54) DISCHARGE LAMP LIGHTING DEVICE

(75) Inventor: Koji Kito, Mizusawa (JP)

(73) Assignee: Hitachi Media Electronics Co., Ltd., Mizusawa (JP)

( * ) Notice: Subject to any disclaimer, the term of this patent is extended or adjusted under 35 U.S.C. 154(b) by 0 days.

(21) Appl. No.: 10/234,101

(22) Filed: Sep. 5, 2002

(65) Prior Publication Data
US 2003/0197478 A1 Oct. 23, 2003

(30) Foreign Application Priority Data
Apr. 19, 2002 (JP) ........................................ 2002-118130

(51) Int. Cl.$^7$ ................................................. G05F 1/00
(52) U.S. Cl. ....................................... 315/308; 315/291
(58) Field of Search .............................. 315/308, 291, 315/82, 307, DIG. 7

(56) References Cited

U.S. PATENT DOCUMENTS 5,973,457 A * 10/1999 Yamashita et al. .......... 315/225
6,127,789 A * 10/2000 Ishizuka et al. ............. 315/308
6,281,642 B1 * 8/2001 Konishi et al. .............. 315/308
6,448,715 B1 * 9/2002 Fujiwara et al. ............ 315/129

* cited by examiner

Primary Examiner—James Clinger
Assistant Examiner—Minh D A
(74) Attorney, Agent, or Firm—Crowell & Moring LLP

(57) ABSTRACT

A discharge lamp lighting device having: a power control circuit for controlling power to be supplied to a discharge lamp; an AC converter circuit provided between the power control circuit and the discharge lamp for converting a DC current into an AC current; a timer circuit for controlling operation of the AC converter circuit; and an igniter circuit for generating a high voltage pulse to thereby activate the discharge lamp; wherein the timer circuit includes: a second timer for starting as a timer in accordance with a power supply activating signal; a first timer for starting as a timer in accordance with lighting of the discharge lamp; and an OR circuit for outputs of the first and second timers. Thus, the DC lighting time is designed to be not changed and stable lighting can be achieved.

3 Claims, 6 Drawing Sheets

DISCHARGE LAMP LIGHTING DEVICE

FIELD OF THE INVENTION

The present invention relates to a discharge lamp lighting device suitable for a projection type display such as a liquid crystal projector.

DESCRIPTION OF THE RELATED ART

High voltage discharge lamps such as metal halide lamps or high-pressure mercury lamps are used as light sources of projection type displays because it is easy for these lamps to obtain high conversion efficiency close to that of point sources. Dedicated discharge lamp lighting devices for supplying voltages and currents required for lighting are used to light the high voltage discharge lamps.

An AC type high voltage discharge lamp is typically once DC-driven for a fixed time by a timer circuit, and then shifted to be AC-driven. In the related art, however, the time between the operation of an igniter circuit and the lighting of the lamp fluctuates due to conditions of the high voltage discharge lamp (e.g. lamp temperature) or variations in the ease of lighting peculiar to the discharge lamp. Accordingly, there is a disadvantage that the time for the discharge lamp to be DC-lit is so short that the discharge lamp is shifted to be AC-lit as its arc remains unstable, and the discharge lamp is blacks out thus.

In addition, the related-art discharge lamp can be activated even if there is a failure such as I/O short-circuit in a power control circuit. Accordingly, there is a disadvantage that a circuit located after the power control circuit, such as an igniter circuit, or the discharge lamp is broken in a chain reaction.

SUMMARY OF THE INVENTION

It is a first object of the invention to provide a discharge lamp lighting device which can light a high voltage discharge lamp quickly and stably regardless of the conditions or variations of the discharge lamp.

It is a second object of the invention to provide a discharge lamp lighting device which can prevent electric circuits or the like located after a power control circuit from being broken in a chain reaction even if there is a failure such as I/O short-circuit in the power control circuit. A discharge lamp lighting device having: a power control circuit for controlling power to be supplied to a discharge lamp;

In order to achieve the first object, according to a first aspect of the invention, there is provided a discharge lamp lighting device having: a power control circuit for controlling power to be supplied to a discharge lamp; an AC converter circuit provided between the power control circuit and the discharge lamp for converting a DC current into an AC current; a timer circuit for controlling operation of the AC converter circuit; and an igniter circuit for generating a high voltage pulse to thereby activate the discharge lamp.

The timer circuit includes: a second timer for starting as a timer in accordance with a power supply activating signal; a first timer for starting as a timer in accordance with lighting of the discharge lamp; and an OR circuit for outputs of the first and second timers.

In order to achieve the second object, according to a second aspect of the invention, there is provided a discharge lamp lighting device having: a power control circuit for controlling power to be supplied to a discharge lamp.

The discharge lamp lighting device further has: a lamp voltage detection terminal for detecting a lamp voltage of the power control circuit; and a protection circuit which is provided so that when a lamp voltage detection signal is outputted from the lamp voltage detection terminal, the protection circuit suspends activation of the discharge lamp even if a lamp-switching-on signal is supplied, and so that when no lamp voltage detection signal is outputted from the lamp voltage detection terminal, the protection circuit allows activation of the discharge lamp in accordance with a lamp-switching-on signal supplied to the protection circuit.

DESCRIPTION OF THE PREFERRED EMBODIMENT

Figure 1:
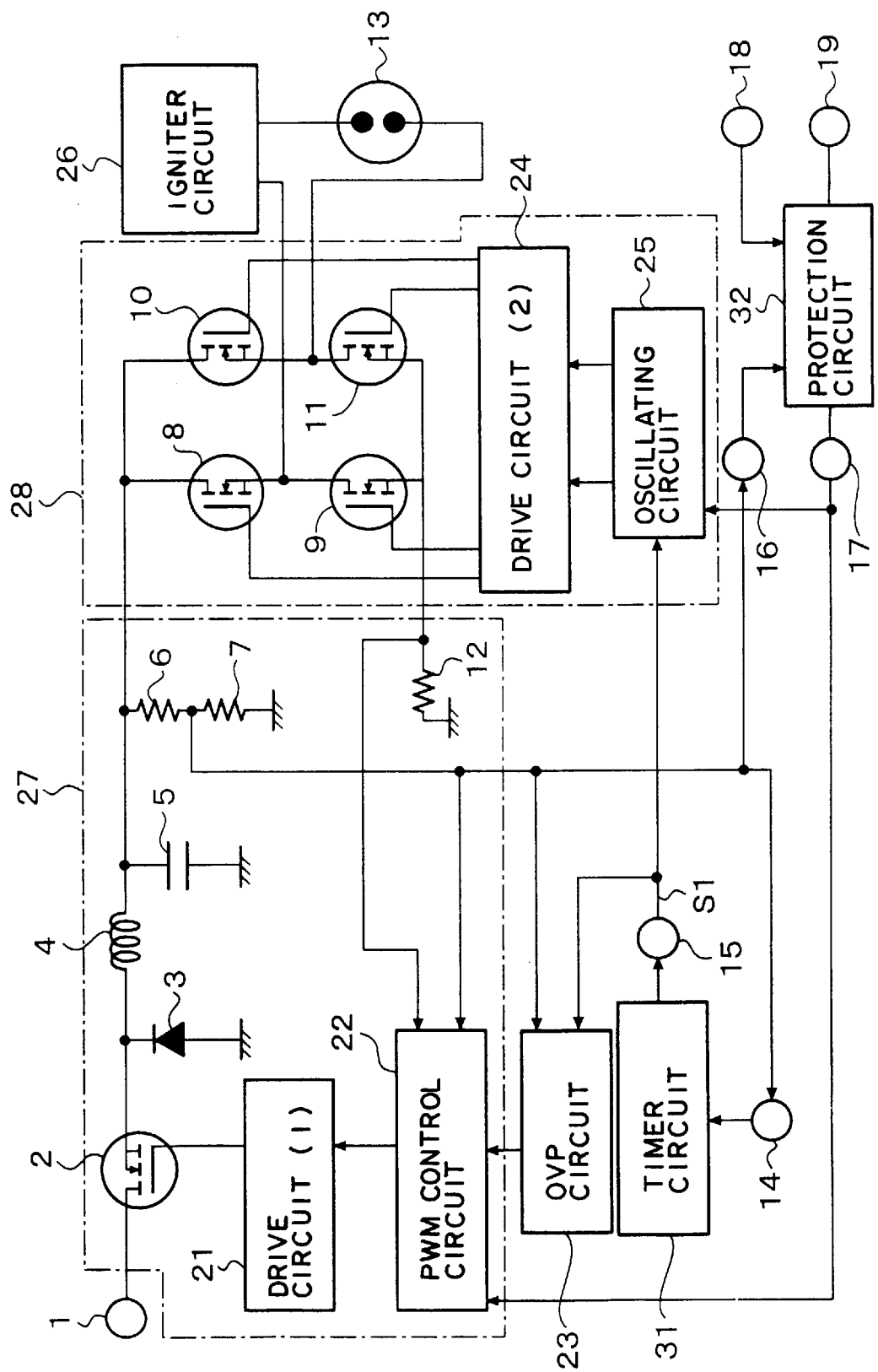
FIG. 1 is a block diagram of a discharge lamp lighting device according to an embodiment of the invention.

Description will be made below on an embodiment of the invention with reference to the drawings. FIG. 1 is a block diagram of a discharge lamp lighting device according to the embodiment of the invention, and FIG. 6 is a schematic configuration view of a projection type display using the discharge lamp lighting device.

Figure 6:
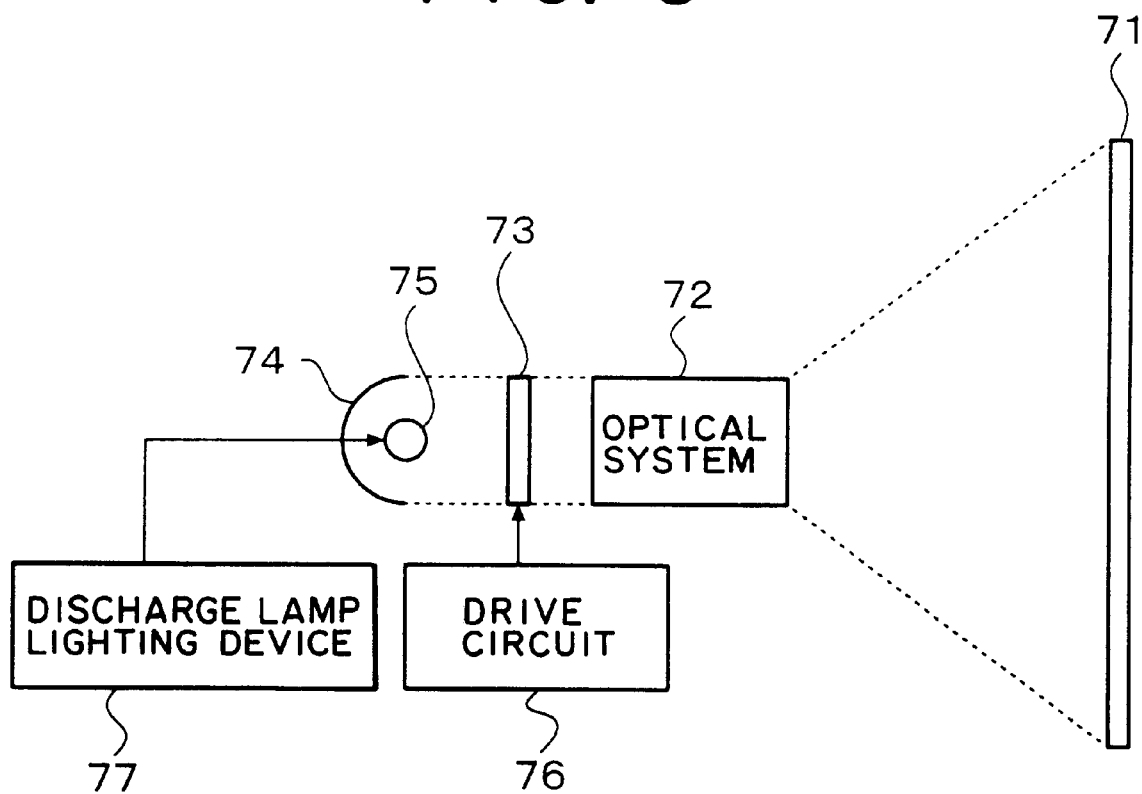
FIG. 6 is a schematic configuration view of a projection type display using the discharge lamp lighting device according to the invention.

The discharge lamp lighting device according to the embodiment of the invention is used suitably in the projection type display shown in FIG. 6 by way of example. As shown in FIG. 6, a reflector 74 and a high voltage discharge lamp 75 constitutes a light source irradiating an image display device 73 with light from the back of the image display device 73. The light transmitted through the image display device 73 is projected onto a screen 71 by an optical system 72. The image display device 73 is, for example, a liquid crystal display. The image display device 73 is driven by an image display device drive circuit 76 so that an image is displayed. Thus, a large screen image is obtained on the screen 71. A discharge lamp lighting device 77 controls the activation and lighting of the high voltage discharge lamp 75.

The discharge lamp lighting device 77 is configured as shown in FIG. 1. In FIG. 1, the reference numeral 1 represents a power supply input terminal; 2, a MOS-FET; 3, a diode; 4, a choke coil; 5, a capacitor; 6 and 7, resistors; 8 to 11, MOS-FETs; 12, a resistor; 13, a discharge lamp; 14 and 16, lamp voltage detection terminals; 15, a timer circuit output terminal; 17, a protection circuit power supply output terminal; 18, an input terminal of a lamp-switching-on signal from a lamp switch (not shown); 19, a protection circuit power supply input terminal; 21, a first drive circuit; 22, a PWM control circuit; 23, an overvoltage protection circuit (OVP circuit); 24, a second drive circuit; 25, an oscillating circuit; 26, an igniter circuit; 31, a timer circuit; and 32, a protection circuit.

As shown by the chain lines, a power control circuit 27 is constituted by the MOS-FET 2, the diode 3, the choke coil 4, the capacitor 5, the resistors 6, 7 and 12, the drive circuit 21 and the PWM control circuit 22. A voltage and a current to be supplied to the discharge lamp 13 is controlled by the PWM control circuit 22 in accordance with the detection results of the voltage and the current.

An AC converter circuit 28 is constituted by the MOS-FETs 8 to 11, the drive circuit 24 and the oscillating circuit 25. The AC converter circuit 28 is provided between the power control circuit 27 and the discharge lamp 13 so as to convert a DC current into an AC current. The igniter circuit 26 generates a high voltage pulse so as to activate the high voltage discharge lamp 13.

The overvoltage protection (OVP) circuit 23 suspends the operation of the power control circuit 27 when an overvoltage appears in the output due to abnormality in the discharge lamp 13 or the like. Thus, the circuits and the discharge lamp 13 are protected.

The timer circuit 31 is connected to the overvoltage protection circuit 23 and the oscillating circuit 25. To activate the discharge lamp 13 stably, it is necessary to generate a high voltage. To this end, control is carried out in accordance with a signal from the timer circuit 13 so as to suspend the operation of the overvoltage protection circuit 23. In addition, to activate the discharge lamp 13 stably, it is necessary to DC-drive the discharge lamp 13. To this end, control is carried out in accordance with a signal from the timer circuit 31 so as to suspend the oscillation of the oscillating circuit 25. For example, the MOS-FETs 8 and 11 are turned on while the MOS-FETs 9 and 10 are turned off. When the timer time has passed, the operation of the overvoltage protection circuit 23 and the oscillation of the oscillating circuit 25 are released from suspension.

The protection circuit 32 controls the power supply to the PWM control circuit 22 or the oscillating circuit 25 in accordance with the lamp-switching-on signal supplied to the terminal 18. At the same time, the protection circuit 32 carries out protection operations such as power-off at the time of overheating.

Figure 2:
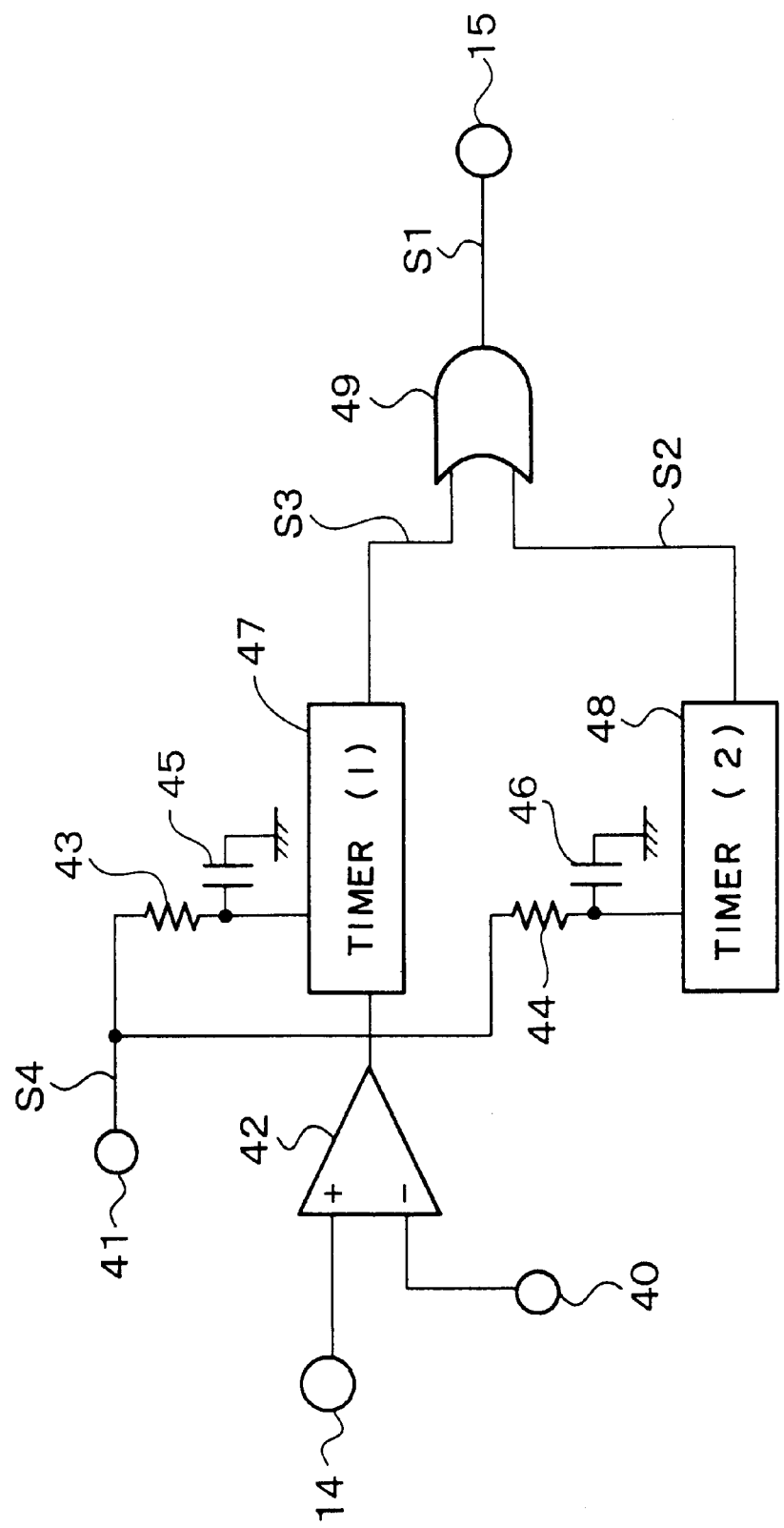
FIG. 2 is a circuit diagram showing an embodiment of a timer circuit for use in the discharge lamp lighting device.

FIG. 2 is a circuit diagram showing an embodiment of the timer circuit 31 in the discharge lamp lighting device shown in FIG. 1. In FIG. 2, the reference numeral 14 represents a lamp voltage detection terminal; 15, a timer circuit output terminal; 40, a reference voltage terminal; 41, a power supply input terminal of the timer circuit 31; 42, a comparator; 43 and 44, resistors; 45 and 46, capacitors; 47, a first timer; 48, a second timer; and 49, an OR circuit. These members are connected as shown in FIG. 2.

Figure 3:
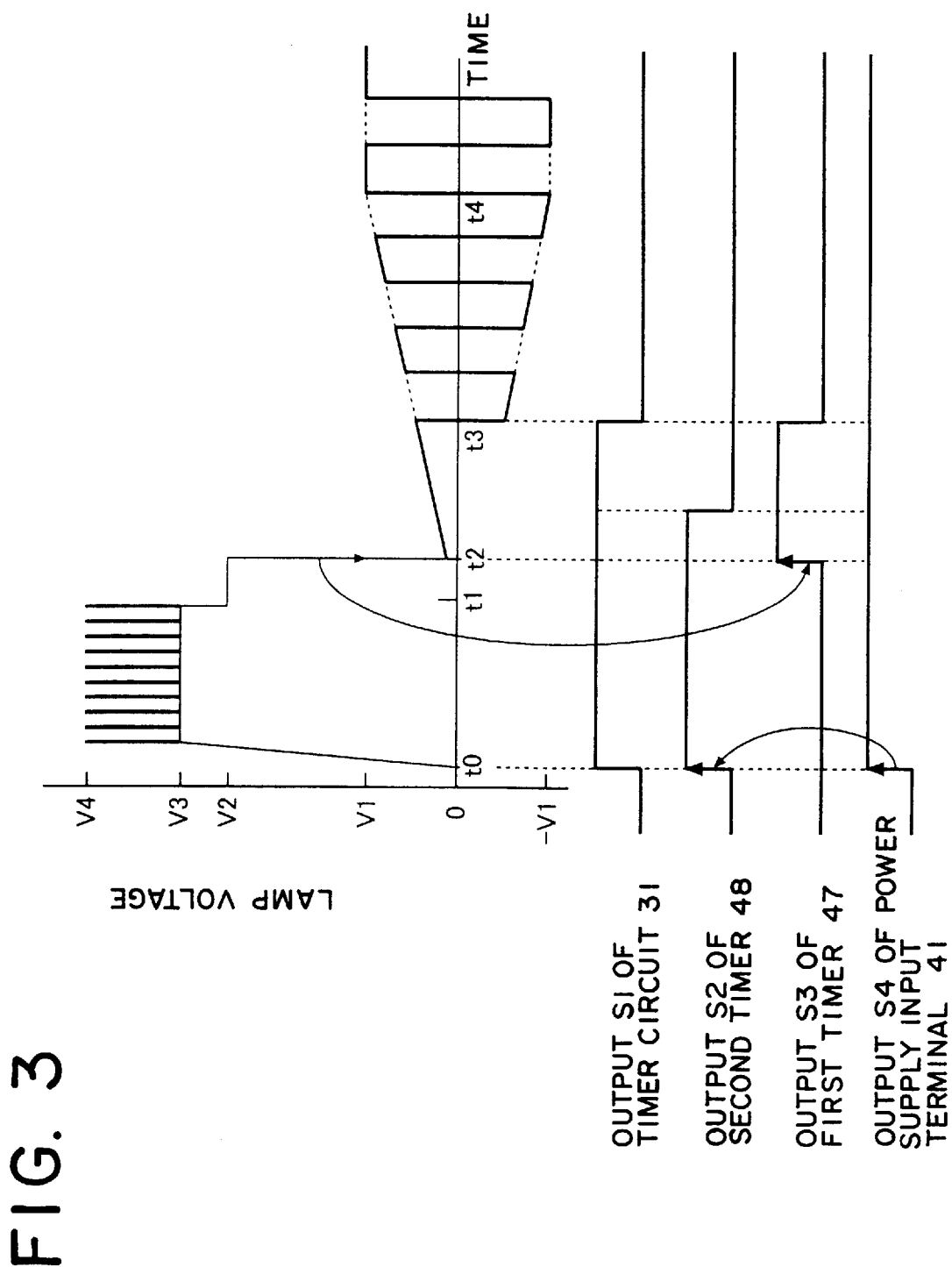
FIG. 3 is a timing chart for explaining the operation of the timer circuit.

Next, description will be made on the operation centering on the timer circuit 31 with reference to FIG. 3. In FIG. 3, the reference sign S1 represents an output voltage of the timer circuit output terminal 15 shown in FIGS. 1 and 2; S2, an output voltage of the second timer 48 shown in FIG. 2; S3, an output voltage of the first timer 47 shown in FIG. 2; and S4, a voltage of the power supply input terminal 41 of the timer circuit 31 shown in FIG. 2.

As shown in FIG. 3, when power is supplied at time t0, a maximum voltage V3 is outputted from the power control circuit 27 because the discharge lamp 13 is not lit. At this time, the output of the second timer 48 is in a high level. Accordingly, the overvoltage protection circuit 23 is not operated. A high voltage pulse from the igniter circuit 26 is superposed on the voltage V3 so that a voltage V4 is applied to the discharge lamp 13. Thus, the discharge lamp is activated.

Then, high-voltage low-current glow discharge is started at time t1, and further shifted to low-voltage high-current arc discharge at time t2. When this voltage change is detected through the lamp voltage detection terminal 14, the positive terminal of the comparator 42 drops to a low level so that the first timer 47 starts. Then, the lamp voltage increases while the lamp temperature increases.

The output of the first timer 47 drops to a low level at time t3, so that the AC converter circuit 28 is operated. Thus, the discharge lamp 13 is shifted to an AC-lighting mode. After that, the output from the power control circuit 27 reaches a steady-state voltage V1 at time t4 so that the power control circuit 27 supplies fixed power to the discharge lamp 13 by constant power control. As a result, quick and stable lighting can be carried out regardless of the conditions or variations of the discharge lamp 13.

Figure 4:
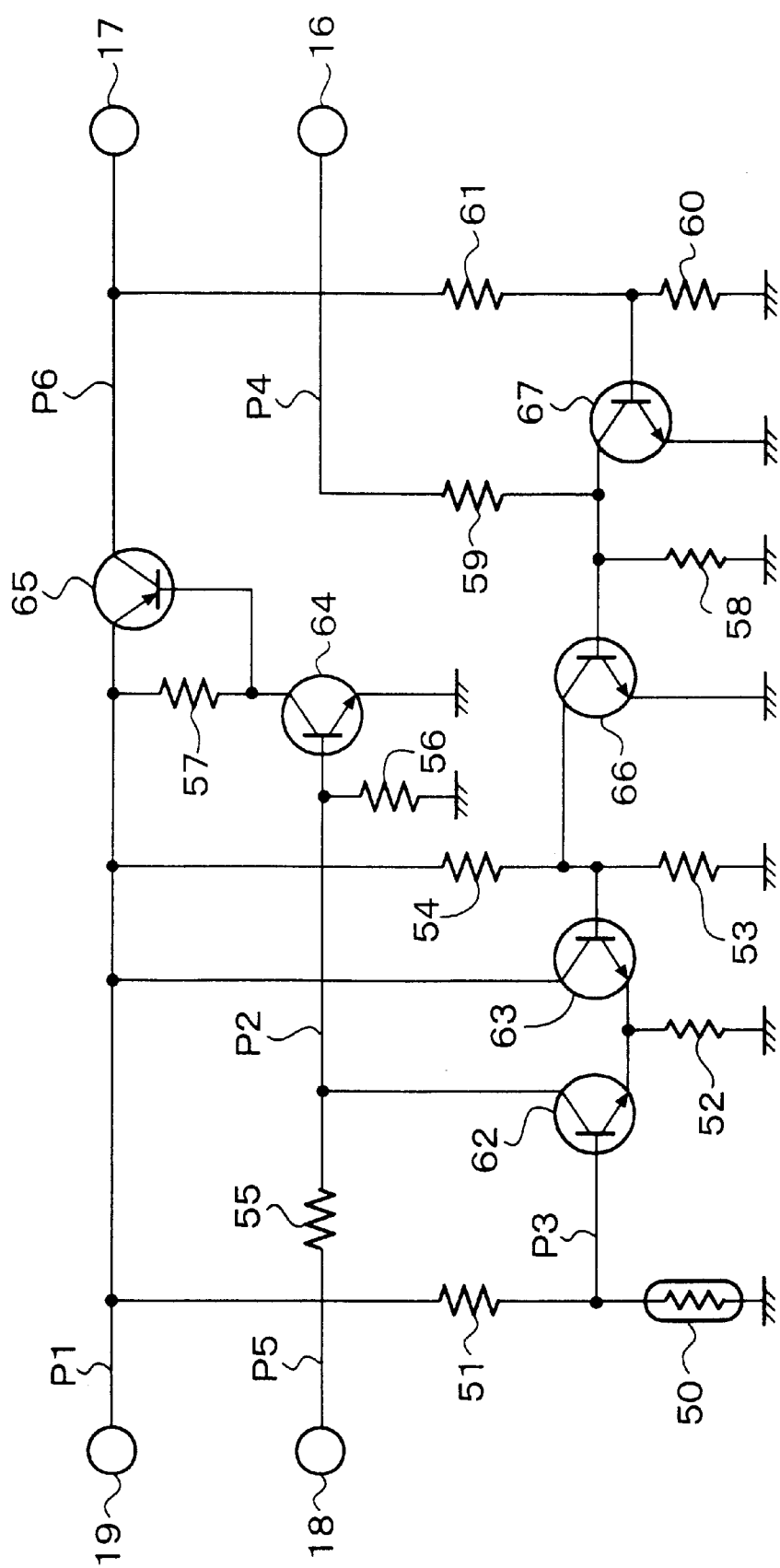
FIG. 4 is a circuit diagram showing an embodiment of a protection circuit for use in the discharge lamp lighting device.

FIG. 4 is a circuit diagram showing an embodiment of the protection circuit 32 shown in FIG. 1. In FIG. 4, the reference numeral 16 represents a lamp voltage detection terminal; 17, a protection circuit power supply output terminal; 18, a lamp-switching-on signal input terminal; 19, a protection circuit power supply input terminal; 50, a thermistor; 51 to 61, resistors; and 62 to 67, transistors.

Figure 5:
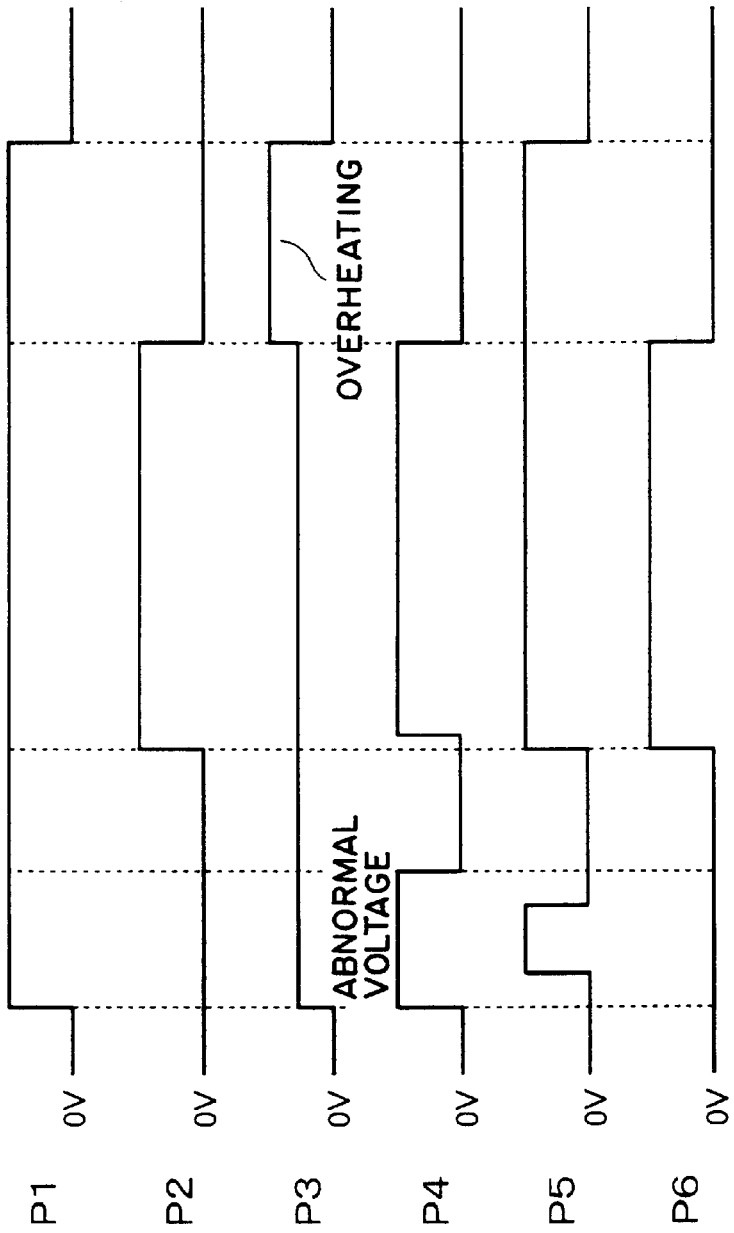
FIG. 5 is a timing chart for explaining the operation of the protection circuit.

With reference to FIG. 5, description will be made on the operation of the protection circuit 32 shown in FIG. 4. In FIG. 5, the reference sign P1 represents an input voltage of the protection circuit power supply input terminal 19; P2, a base voltage of the transistor 64; P3, a partial voltage of the input voltage P1 divided by the thermistor 50 and the resistor 51; P4, a detected voltage of the lamp voltage detection terminal 16; P5, a lamp-switching-on signal (activating signal) of the input terminal 18; and P6, a voltage of the protection circuit power supply output terminal 17.

As shown in FIG. 5, first, the voltage P1 is supplied to the protection circuit power supply input terminal 19. When the voltage P4 of the lamp voltage detection terminal 16 is high enough to turn ON the transistor 66, the base voltage P2 of the transistor 64 becomes low. As a result, even if the lamp-switching-on signal P5 (activating signal) is supplied to the lamp-switching-on signal input terminal 18, the transistors 64 and 65 cannot be turned ON. Thus, the voltage P6 of the protection circuit power supply output terminal 17 remains 0 V so that the discharge lamp 13 cannot be activated. Accordingly, if there is a failure such as I/O short-circuit in the power control circuit 27, the protection circuit 32 cannot be activated, so that chain breakdown can be prevented.

When a voltage high enough to turn ON the transistor 66 is not supplied to the lamp voltage detection terminal 16, the transistor 64 is turned ON in accordance with the lamp-switching-on signal P5 (activating signal) so that the transistor 65 is turned ON and the voltage P6 of the protection circuit power supply output terminal 17 is outputted. Thus, the discharge lamp 13 can be activated. After the activation, the voltage P4 indeed appears in the lamp voltage detection terminal 16. The transistor 66 is, however, kept OFF because the transistor 67 is ON. Thus, there is no fear that the protection circuit 32 malfunctions.

Incidentally, after the activation, when the resistance value of the thermistor 50 increases due to overheating caused by the increase of loss or the like so that the voltage P3 increases to a level high enough to turn on the transistor 62. The base voltage P2 of the transistor 64 becomes low so that the transistors 64 and 65 are turned off. As a result, the voltage P6 of the protection circuit power supply output terminal 17 drops so that the operations of the PWM control circuit 23 and the oscillating circuit 25 are suspended. Thus, protection can be carried out all over the circuits.

According to the first aspect of the invention, a timer circuit includes a second timer for starting as a timer in accordance with a power supply activating signal, a first timer for starting as a timer in accordance with lighting of a discharge lamp, and an OR circuit for outputs of the first and second timers. Since DC lighting time is designed thus to be not changed, quick and stable lighting can be carried out regardless of the conditions and variations of the discharge lamp.

According to the second aspect of the invention, a protection circuit is provided so that when a lamp voltage detection signal is outputted from a lamp voltage detection terminal, the protection circuit suspends the activation of the discharge lamp even if a lamp-switching-on signal is supplied. Thus, chain breakdown can be prevented when there is a failure such as I/O short-circuit in a power control circuit.

What is claimed is:

1. A discharge lamp lighting device comprising:

a power control circuit for controlling power to be supplied to a discharge lamp;

an AC converter circuit provided between said power control circuit and said discharge lamp for converting a DC current into an AC current;

a timer circuit for controlling operation of said AC converter circuit; and an igniter circuit for generating a high voltage pulse to thereby activate said discharge lamp;

wherein said timer circuit includes:

a second timer for starting as a timer in accordance with a power supply activating signal;

a first timer for starting as a timer in accordance with lighting of said discharge lamp; and an OR circuit for outputs of said first and second timers.

2. A discharge lamp lighting device comprising:

a power control circuit for controlling power to be supplied to a discharge lamp;

a lamp voltage detection terminal for detecting a lamp voltage of said power control circuit; and a protection circuit which is provided so that when a lamp voltage detection signal is outputted from said lamp voltage detection terminal, said protection circuit suspends activation of said discharge lamp even if a lamp-switching-on signal is supplied, and so that when no lamp voltage detection signal is outputted from said lamp voltage detection terminal, said protection circuit allows activation of said discharge lamp in accordance with a lamp-switching-on signal supplied to said protection circuit.

3. A discharge lamp lighting device according to claim 1 or 2, wherein said discharge lamp is a discharge lamp for a projection type display.

* * * * *